United States Patent [19]

van Leuwen et al.

[11] 4,008,189
[45] Feb. 15, 1977

[54] HYDROPHILIC POLYURETHANE FOAM

[75] Inventors: Bruce G. van Leuwen, Trumbull; Clifford J. Maxwell, Milford, both of Conn.

[73] Assignee: Olin Corporation, New Haven, Conn.

[22] Filed: Nov. 4, 1975

[21] Appl. No.: 628,727

Related U.S. Application Data

[63] Continuation-in-part of Ser. No. 475,694, June 3, 1974, abandoned, which is a continuation-in-part of Ser. No. 382,390, July 25, 1973, abandoned.

[52] U.S. Cl. .................. 260/2.5 AD; 260/2.5 AP
[51] Int. Cl.² ................ C08G 18/48; C08G 18/14
[58] Field of Search ............... 260/2.5 AD, 2.5 AP

[56] References Cited

UNITED STATES PATENTS 3,457,203   7/1969   Cohen .................. 260/2.5 AD

*Primary Examiner*—C. Warren Ivy
*Attorney, Agent, or Firm*—F. A. Iskander; T. P. O'Day

[57] ABSTRACT

An improvement is disclosed in the preparation of hydrophilic polyurethane foams. The improvement comprises employing, as the polyol reactant used in making the foam, a mixture of selected oxyalkylated polyhydric alcohols. The resulting foam has improved wet strength properties and is particularly useful in cleaning and similar applications.

13 Claims, No Drawings

HYDROPHILIC POLYURETHANE FOAM

This application is a continuation-in-part of co-pending U.S. application Ser. No. 475,694, filed June 3, 1974 which was in turn a continuation-in-part of now abandoned U.S. application Ser. No. 382,390 filed July 25, 1973: both now abandoned.

This invention relates to the preparation of hydrophilic polyurethane foam. More particularly, the invention relates to a hydrophilic polyether polyurethane foam composition having improved physical properties and to a process for making such a foam.

Hydrophilic polyurethane foams are of utility in various applications which require the use of a porous, high water-absorbent material. They are used for example in numerous washing and cleaning applications as substitutes for cellulosic sponges. Inasmuch as they have a marked affinity for, and a substantial capacity to hold, water, they can also be used as water barriers and interliners in disposable baby diapers.

Polyether polyurethane foam is generally prepared by reacting an organic polyisocyanate with a polyether polyol in the presence of a foaming agent and a reaction catalyst. A commonly used group of polyether polyols for this purpose are the adducts of polyhydric alcohols and an alkylene oxide such as propylene oxide, ethylene oxide, butylene oxide, and mixtures of these oxides. See for example U.S. Pat. No. 3,194,773, No. 3,238,273, No. 3,336,242, No. 3,380,967, No. 3,461,086, No. 3,457,203, and No. 3,546,145.

It is known in this particular art that in order to achieve satisfactory hydrophilic properties in the foam, the polyhydric alcohol-alkylene oxide adduct reactant which is used must contain a certain proportion of ethylene oxide in the molecule. See U.S. Pat. No. 3,457,203. Thus hydrophilic polyurethane foams are generally prepared, according to the prior art, from such adducts which are products of condensing a polyhydric alcohol with a mixture of ethylene oxide and a higher alkylene oxide such as propylene oxide.

However, it has not been possible, according to prior art methods for making hydrophilic polyurethane foam, to achieve in such a foam both a sufficient degree of hydrophilicity combined with good wet strength properties. Thus typically prior art hydrophilic polyurethane foams exhibit marked deterioration in physical properties when they absorb water. Consequently, such foams cannot be used to advantage for example in certain water washing applications, e.g., scrubbing, which require a hydrophilic material having a sufficient degree of wet strength.

Now it has been found, in accordance with the invention, that hydrophilic polyurethane foams having improved wet strength properties, can be prepared from a reaction mixture comprising a select mixture of three polyols as described in detail hereinbelow. As such, these foams are of particular utility in wet cleaning and scrubbing applications.

In preparing the polyurethane foams of the invention, either the so-called "one-shot method" or the "prepolymer technique" may be used, the one-shot method being preferred. These foams are prepared from a reaction mixture comprised of an organic polyisocyanate, a foaming agent, a reaction catalyst, and, as the polyol reactant, a select mixture or combination of three polyether polyols.

Any organic polyisocyanate which is useful in the preparation of polyurethane foams can be employed in practicing the process of the invention. This includes for example toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'bitoluene-4,4'-diisocyanate, hexamethylene diisocyanate, naphthalene-1,5-diisocyanate, polymethylene polyphenylisocyanate, mixtures thereof and the like, The preferred organic polyisocyanate is toluene diisocyanate. The amount of polyisocyanate employed in the process of this invention should be sufficient to provide at least about 0.7 NCO group per hydroxyl group present in the reaction system, which includes all the polyol reactants as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH group times 100 is referred to as the "index."

The polyurethane foams of the invention are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Preferably, a mixture comprised of a tertiary amine and a metallic salt is employed as the catalyst. Any catalytic proportion of catalysts may be employed. However, the catalyst or catalyst mixture, as the case may be, is usually employed in an amount ranging between about 0.05 and about 1.5, and preferably between about 0.075 and about 0.05 parts by weight per every 100 parts of total polyols.

It is preferred in the preparation of the polyurethane foams of the invention to employ minor amounts of a conventional surfactant in order to further improve the cell structure of the polyurethane foam. Typical of these are the silicon surfactants, e.g., the silicone oils and soaps and the siloxane-oxyalkylene block copolymers. U.S. Pat. No. 2,834,748 and T. H. Ferrigno, *Rigid Plastic Foams* (New York:Reinhold Publishing Corp., 1963), p.p. 38–42 disclose various surfactants which are useful for this purpose. Generally up to two parts by weight of the surfactants are employed per 100 parts of total polyols.

Following the teachings of the invention, the polyol which is used to prepare the polyurethane foam is comprised of three oxyalkylated polyether polyol reactants. The first of these is characterized by a trihydroxy alcohol nucleus, polyoxyethylene chain segments attached through one end thereof to the nucleus, and polyoxypropylene chain segments attached through one end thereof to the polyoxyethylene chain segments. Such a polyol can be prepared by methods well known in the art wherein a triol initiator is sequentially condensed, in the presence of an alkaline catalyst such as KOH, first with ethylene oxide and then with propylene oxide.

The initiator used in preparing the first polyol reactant can be any aliphatic triol such as glycerol, trimethylolpropane, triethylolpropane, 1,3,5-hexanetriol, 1,2,6-hexanetriol, 1,4,6-octanetriol, mixtures thereof, and the like. The preferred initiators are glycerol and trimethylolpropane.

As noted above, in preparing the first polyol reactant, the triol initiator is oxyalkylated first with ethylene oxide and then with propylene oxide. Such proportions of ethylene oxide and propylene oxide are employed as to provide (1) a molar ratio of ethylene oxide to propylene oxide ranging from about 0.3:1 to about 1.6:1, and preferably from about 0.8:1 to about 1.5:1; and (2) a molecular weight of the first polyol ranging from about 3,000 to about 5,000, preferably about 3,500–4,500 and more preferably about 3,800–4,200.

The second polyol reactant which is used according to the invention is characterized by a dihydroxy alcohol nucleus, polyoxyethylene chain segments attached through one end thereof to the nucleus, and polyoxypropylene chain segments attached through one end thereof to the polyoxyethylene chain segments. This second polyol is prepared using essentially the same oxyalkylation technique referred to above in connection with the preparation of the frist polyol reactant. Here, however, a diol initiator is used which is exemplified by the aliphatic diols such as ethylene glycol, propylene glycol, the butylene glycols, the pentylene glycols, the hexylene glycols, mixtures thereof and the like. Generally, ethylene glycol and propylene glycol are preferred. Such proportions of the ethylene oxide and propylene oxide are used as to provide (1) a molar ratio of ethylene oxide to propylene oxide ranging from about 0.3:1 to about 1.4:1 and preferably about 0.7:1 to to about 1.2:1; and (2) a molecular weight of the second polyol of about 2,000–5,000, preferably about 3,000–4,500, and more preferably about 3,400–4,200.

The third polyol reactant which is used according to the invention is one which is characterized by a trihydroxy alcohol nucleus and random chains of ethylene oxide and a higher alkylene oxide attached to the nucleus. This second polyol is a condensation product of an aliphatic triol initiator with a random mixture of ethylene oxide and a higher alkylene oxide having 3–4 carbon atoms, e.g., propylene oxide, butylene oxide or a mixture thereof. The preferred higher alkylene oxide is propylene oxide. Any aliphatic triol may be used as illustrated hereinabove in connection with the preparation of the first polyol, the most preferred aliphatic triols being glycerol and trimethylolpropane.

In preparing the third polyol, such proportions of ethylene oxide and higher alkylene oxides are used such as to provide an ethylene oxide content of about 5–25, and preferably about 8–20, percent by weight, the balance being a higher alkylene oxide or a mixture thereof. Furthermore, the total proportion of ethylene oxide and higher alkylene oxide which is used is such as to achieve in the third polyol a molecular weight of about 2,400–5,000, preferably about 2,700–4,500, and more preferably about 3,000–4,200.

In accordance with the invention, the above-described three polyols are used in preparing the polyurethane foam. If desired, they may be blended together before being brought together with the other foam-forming ingredients; or, alternatively, each polyol may be added individually to the other foam-forming ingredients. As a percentage of the combined weights of the three polyols, the weight proportion of the first polyol which is used ranges from about 10 to about 50, and preferably about 18–45, percent; the weight proportion of the second polyol ranges from about 20 to about 50, and preferably about 25–45, percent; and the weight proportion of the third polyol ranges from about 10 to about 50, and preferably about 18–45, percent. This is provided of course that the combined or total weight of the three polyols is equal to 100 percent by weight.

In the practice of this invention, a polyurethane foam-forming reaction mixture comprising the above-described ingredients is fed to a suitable reaction zone such as by pouring into a suitable mold or onto a moving conveyor belt where reaction proceeds, The foaming reaction is exothermic, and auxiliary heat is usually not necessary to effect the reaction, although it may be employed. After the reactants have been admixed for a period of between about 0.1 and about 20 seconds, a emulsion or "cream" forms. As the temperature increases from the reaction, gas bubbles are generated bringing about the formation of an uncured cellular gel material which usually cures fairly rapidly at room temperature. Once cured, the foam will be ready for use in various applications.

The polyurethane foams of the invention are characterized by a combination of desirable physical properties. They have hydrophilic properties coupled with high tensile and tear strength. Furthermore, these foams undergo relatively less deterioration in physical strength properties as a result of being wetted, than conventional hydrophilic polyurethane foams. Thus the foams of the invention have improved wet strength properties, and as such they are of particular utility in water cleaning applications which require rigorous scrubbing and a sufficient degree of resistance to wear and tear.

The following examples are provided to illustrate the invention. In these examples, all parts and percentages are by weight unless otherwise specified. In the examples, flexible polyurethane foams are prepared using various polyol compositions. Otherwise, the other ingredients employed in making the foam were identical. Thus in the case of each example, per every 100 parts by weight of total polyol, there were used the following ingredients in the indicated proportions:

| Ingredients | Parts By Weight |
| --- | --- |
| Toluene diisocyanate (mixture of 80%, 2,4- and 20% 2,6-isomer) | 35.5 |
| Surfactant (a polydimethylsiloxane purchased commercially under the trademark "Dow Corning 192") | 3.0 |
| Stannous octoate catalyst | 0.1 |
| Triethylene diamine catalyst composition (purchased commercially under the trademark "Dabco 33LV") | 0.3 |
| Water | 3.0 |

EXAMPLES 1–5

Five foams were prepared using the above-described ingredients and various combinations of three polyols identified as "Polyol A," "Polyol B" and "Polyol C." These three polyols are described below.

Polyol A — a 4,000 molecular weight polyether triol prepared by sequentially condensing glycerol with equal proportions of ethylene oxide (initial block) and then propylene oxide.

Polyol B — a 4,000 molecular weight polyether diol containing 40% ethylene oxide residue and 60% propylene oxide residue. This was prepared by sequentially condensing propylene glycol first with ethylene oxide (initial block) and then with propylene oxide.

Polyol C — a 4,000 molecular weight, random EO-PO polyether triol. This was prepared by condensing glycerol with a random mixture of 15% ethylene oxide and 85% propylene oxide. The proportions of each of the three polyols used in making the five foams are indicated in Table 1 below. Each of the five foams was tested for tensile strength, elongation, and tear strength, these tests being carried out twice, once with the foam in the dry state and again after wetting, i.e., after completely soaking the foam with water followed by squeezing excess water absorbed within the foam cells. All three tests were carried out according to ASTM 1564–64. The tensile strength, expressed in pounds per square inch, is a measure of the force per unit cross-sectional area, which must be exerted on a standard sample to cause it to snap or break. The elongation, expressed as a percentage of the original length of the sample, is a measure of the length that the sample is stretched to before it snaps or breaks. The tear strength is expressed in pounds per linear inch, and this indicates the force necessary to cause a one-inch tear in a standard sample.

The results of the tests are provided in Table 1 below.

Comparisons 1–3

These comparisons are provided to demonstrate the criticality of using three polyols, as specified according to the invention, in order to achieve improved wet strength properties in the resulting foam. Each comparison was carried out exactly as described in Examples 1–5 except for variations in the polyol reactants used. Thus instead of the three polyols used in these Examples, in Comparison 1, 100 parts of Polyol A were used; in Comparison 2, a mixture of 60 parts of Polyol A and 40 parts of Polyol B was used; and in Comparison 3, 100 parts of a prior art hydrophilic foam polyol was used. The latter, identified as Polyol D, was a 4,000 molecular weight random polyether triol prepared by condensing glycerol with a 50/50 mixture of ethylene oxide and propylene oxide. The results of the three comparisons are provided in Table 1 below.

TABLE 1

| Polyols Used | E-1 | E-2 | E-3 | E-4 | E-5 | C-1 | C-2 | C-3 |
|---|---|---|---|---|---|---|---|---|
| % Polyol A | 30 | 40 | 20 | 35 | 40 | 100 | 60 | |
| % Polyol B | 40 | 40 | 40 | 30 | 30 | | 40 | |
| % Polyol C | 30 | 20 | 40 | 35 | 30 | | | |
| % Polyol D | | | | | | | | 100 |
| Physical Properties (per ASTM 1564–64) | | | | | | | | |
| Tensile Strength (lbs./sq.in.) | | | | | | | | |
| Dry | 16.2 | 16.6 | 16.2 | 14.6 | 14.3 | 12.5 | 12.0 | 13.2 |
| Wet | 10.4 | 9.1 | 9.7 | 9.2 | 8.3 | 5.6 | 6.0 | 6.1 |
| % Elongation | | | | | | | | |
| Dry | 397 | 377 | 370 | 320 | 350 | 260 | 407 | 290 |
| Wet | 253 | 200 | 240 | 200 | 210 | 130 | 210 | 140 |
| Tear Strength (lbs./lin.in.) | | | | | | | | |
| Dry | 3.3 | 2.9 | 3.0 | 2.9 | 2.8 | 2.3 | 2.2 | 1.8 |
| Wet | 1.9 | 1.1 | 1.5 | 1.2 | 1.1 | 0.5 | 0.6 | 0.5 |

The data in Table 1 demonstrates the improvement in wet strength properties, particularly tear strength, which characterizes several hydrophilic foams (E-1 through E-5) prepared according to the invention as contrasted with other foams (C-1 through C-3).

EXAMPLE 6

A polyurethane foam was prepared using the exact formulation of Example 1. The resulting foam was subjected to two tests in order to determine its hydrophilic properties, these properties being measured in terms of water absorption rate and degree of swelling upon complete immersion in water. In measuring the water absorption rate, the following procedure was followed. One milliliter of water was carefully placed on a horizontally cut surface of the foam. Then a stop watch was used to clock the time elapsed from the moment the water was placed on the foam to the moment when total absorption of the water into the foam was visually noted. The result of this test was recorded in terms of seconds per milliliter of water absorbed.

In determining the degree or percentage of swelling, the following procedure was followed. A standard-size cut sample of foam, measuring 4 inches by 4 inches by 2 inches, was immersed in a container of water and, while so immersed, it was squeezed or wrung three times in order to expel any air bubbles that might still be trapped within the foam cells. Then the foam sample was left immersed in the water for two hours. Thereafter, while still so immersed, the dimensions of the sample were measured and its volume calculated. The percentage increase over the dry volume was calculated as % swell.

The results of the two tests, confirming the hydrophilic nature of the foam, are given below.

| | |
|---|---|
| Absorption Rate (sec./min.) | 30 |
| % Swell | 60 |

What is claimed is:

1. A process for preparing flexible, hydrophilic polyurethane foam from a reaction mixture comprised of an organic polyisocyanate, a foaming agent, a reaction catalyst, and three polyether polyols, namely,
   a. a first polyol having a molecular weight of about 3,000—5,000 which is the product of sequentially oxyalkylating an aliphatic triol first with ethylene oxide and then with propylene oxide using a molar ratio, ethylene oxide: propylene oxide, from about 0.3:1 to about 1.6:1, said first polyol being used in a weight proportion from about 10 to about 50 percent of the combined weights of said three polyols, b. a second polyol having a molecular weight of about 2,000–5,000 which is the product of sequentially oxyalkylating an aliphatic diol first with ethylene oxide and then with propylene oxide using a molar ratio, ethylene oxide:propylene oxide, from about 0.3:1 to about 1.4:1, said second polyol being used in a weight proportion of about 20–50 percent of the combined weights of said three polyols, and c. a third polyol having a molecular weight of about 2,400–5,000 which is the product of oxyalkylating an aliphatic triol with a random mixture of ethylene oxide and propylene oxide, the content of ethylene oxide in the mixture being about 5–25% by weight, said third polyol being used in a proportion of about 10–50 percent of the combined weights of said three polyols.

2. A one-shot polyurethane foam prepared by the process of claim 1.

3. The process of claim 1 wherein said organic polyisocyanate is toluene diisocyanate and said foaming agent is water.

4. The process of claim 1 wherein said molar ratio, ethylene oxide: propylene oxide, used in preparing said first polyol ranges from about 0.8:1 to about 1.5:1.

5. The process of claim 4 wherein said molar ratio, ethylene oxide: propylene oxide, used in preparing said second polyol ranges from about 0.7:1 to about 1.2:1.

6. The process of claim 5 wherein said mixture of ethylene oxide and propylene oxide, which is used in preparing said third polyol, has an ethylene oxide content of about 8–20 percent by weight.

7. A polyurethane foam prepared by the process of claim 6.

8. The process of claim 6 wherein the molecular weight of said first polyol is about 3,800–4,200, the molecular weight of said second polyol is about 3,400–4,200, and the molecular weight of said third polyol is about 3,000–4,000.

9. The process of claim 8 wherein said weight proportion of said first polyol is about 18–45 percent, said weight proportion of said second polyol is about 25–45 percent, and said weight proportion of said third polyol is about 18–45 percent.

10. The process of claim 9 wherein said reaction mixture comprises a surfactant.

11. The process of claim 10 wherein
 a. said first polyol has a molecular weight of about 4,000 and is the product of sequentially condensing an aliphatic triol with equal proportions by weight of ethylene oxide and propylene oxide,
 b. said second polyol has a molecular weight of about 4,000 and the weight ratio of ethylene oxide:propylene oxide used in its preparation is about 40:60,
 c. said third polyol has a molecular weight of about 4,000 and the weight ratio of ethylene oxide:propylene oxide used in its preparation is about 15:85.

12. A polyurethane foam prepared by the process of claim 11.

13. The process of claim 11 wherein said organic polyisocyanate is toluene diisocyanate, said surfactant is a polydimethylsiloxane, said foaming agent is water, and said catalyst comprises a tertiary amine and stannous octoate.

* * * * *